(12) United States Patent
Merrill et al.

(10) Patent No.: US 8,419,390 B2
(45) Date of Patent: Apr. 16, 2013

(54) ELECTRICAL SUBMERSIBLE PUMP SYSTEM CONNECTION ADAPTER

(75) Inventors: Dan A. Merrill, Claremore, OK (US); Daniel A. Shaffer, Talala, OK (US); Dick L. Knox, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 478 days.

(21) Appl. No.: 12/635,191

(22) Filed: Dec. 10, 2009

(65) Prior Publication Data

US 2010/0150751 A1 Jun. 17, 2010

Related U.S. Application Data

(60) Provisional application No. 61/121,813, filed on Dec. 11, 2008.

(51) Int. Cl.
 *F04B 35/04* (2006.01)
 *H02K 15/00* (2006.01)
 *F16J 15/16* (2006.01)

(52) U.S. Cl.
 USPC .................. 417/423.11; 417/423.3; 417/423.6

(58) Field of Classification Search ............... 417/423.3, 417/423.6, 423.11; 277/352, 353, 366
See application file for complete search history.

(56) References Cited

U.S. PATENT DOCUMENTS

| | | | |
|---|---|---|---|
| 5,908,288 A | 6/1999 | Moran | |
| 5,954,483 A | 9/1999 | Tetzlaff | |
| 6,193,474 B1 | 2/2001 | Tetzlaff | |
| 6,241,016 B1 | 6/2001 | Dedels | |
| 6,322,331 B1 | 11/2001 | Swatek et al. | |
| 6,602,059 B1 * | 8/2003 | Howell et al. | 417/423.3 |
| 6,666,664 B2 | 12/2003 | Gross | |
| 6,752,560 B2 * | 6/2004 | Wilson et al. | 403/1 |
| 6,863,124 B2 | 3/2005 | Araux et al. | |
| 6,883,604 B2 * | 4/2005 | Mack et al. | 166/105 |
| 6,929,064 B1 | 8/2005 | Susman | |
| 6,964,299 B2 | 11/2005 | Scarsdale | |
| 7,325,601 B2 | 2/2008 | Mack et al. | |
| 7,549,467 B2 | 6/2009 | McDonald et al. | |
| 2007/0224057 A1 * | 9/2007 | Swatek et al. | 417/414 |
| 2009/0202371 A1 * | 8/2009 | Green | 417/423.3 |

* cited by examiner

*Primary Examiner* — Devon Kramer
*Assistant Examiner* — Dominick L Plakkoottam
(74) *Attorney, Agent, or Firm* — Bracewell & Giuliani LLP (57) ABSTRACT

An electrical submersible pumping assembly having a seal section and a motor section, and seals that prevent leakage from the seal section and the motor section during assembly. The seals cooperate with a coupling assembly for coupling together shafts from both the seal section and motor section. The coupling assembly outer diameter enlarges at a shoulder that circumscribes its outer surface. In one example, the seal that prevents leakage from the seal assembly provides a sealing interface around the larger diameter portion of the coupling assembly, that is removable by sliding the coupling so its smaller diameter portion is adjacent the seal assembly. The motor section is sealed by another sealing assembly that includes a body that circumscribes the motor shaft to define an annulus, a sealing disk selectively fills the annulus. The sealing disk can also be slid away from within the body while coupling the shafts with the coupling assembly.

17 Claims, 6 Drawing Sheets

ELECTRICAL SUBMERSIBLE PUMP SYSTEM CONNECTION ADAPTER

CROSS-REFERENCE TO RELATED APPLICATIONS

The present application relates to U.S. provisional application 61/121,813 filed on Dec. 11, 2008, the entire specification of which being herein incorporated by reference.

BACKGROUND

1. Field of the Invention

This invention relates in general to oil and gas production, and in particular to coupling segments of an electrical submersible pump.

2. Background of the Invention

Electrical submersible pumps (ESP) may be deployed within a wellbore to pump downhole fluid to the surface. Typically, an ESP includes an electrical motor, a seal section, and a pump that is driven by the motor. The pump can discharge pressurized fluid directly into the wellbore or into connected production tubing. A typical seal section includes a diaphragm that is in pressure communication with ambient pressure on one side, and on its other side in pressure communication with the motor section. A body of substantially incompressible equalizing fluid, such as a dielectric fluid, fills the diaphragm, the motor section, and the fluid paths or passageways between the diaphragm and the motor section. Maintaining the pressure within the motor section at substantially ambient pressure minimizes a pressure differential across the housing and seals of the motor section; thereby reducing the chances of a breach in the housing or seals that would allow fluid ingress.

Prior to assembling an ESP, the seal section is typically filled with an equalizing fluid and then purged of any air that may remain inside after being filled. When the ESP is vertically assembled, equalizing fluid may leak from the bottom of the seal section as it is being connected to the motor. Any voids formed in the seal section by leaked equalizing fluid, can allow compressible air to reenter the seal section, thereby partially disabling its equalizing abilities. The motor section is also typically filled with fluid prior to assembly. Generally a motor section is not prone to fluid leakage when the ESP is vertically assembled, however the motor section can leak if the ESP is horizontally assembled.

SUMMARY OF THE INVENTION

Disclosed herein is an example of an electrical submersible pumping assembly having a seal section and a motor section, and seals that prevent leakage from the seal section and the motor section during assembly. When the seal and motor sections are coupled, the seals move out of sealing alignment to allow fluid communication between these sections. The seals cooperate with a coupling assembly for coupling together shafts from both the seal section and motor section. The coupling assembly outer diameter enlarges at a shoulder that circumscribes its outer surface. In one example, the seal that prevents leakage from the seal assembly provides a sealing interface around the larger diameter portion of the coupling assembly, that is removable by sliding the coupling so its smaller diameter portion is adjacent the seal assembly. The motor section is sealed by another sealing assembly that includes a body that circumscribes the motor shaft to define an annulus, a sealing disk selectively fills the annulus. The sealing disk can also be slid away from within the body while coupling the shafts with the coupling assembly.

In one example embodiment, the electrical submersible pumping system includes a seal section having a housing with an opening at an end, fluid within the housing, and a seal shaft within the opening in the seal housing, a motor section having a housing having an opening at an end, and a motor shaft extending from the opening in the motor housing, a tubular coupling assembly having a splined axial bore and selectively moveable between a pre-assembly position with the seal shaft partially inserted into an inner end of the coupling assembly and an assembled position axially spaced from the pre-assembly position with the seal shaft fully inserted into the inner end and the motor shaft fully inserted into an outer end of the coupling assembly to transmit torque from the motor shaft to the seal shaft, and a seal section fluid retaining seal mounted to the housing of the seal section and in sealing engagement with an outer diameter portion of the coupling assembly to thereby form a fluid barrier between the outer diameter of the coupling assembly and housing of the seal section when the coupling assembly is in the pre-assembly position and when the coupling assembly is moved to the assembled position, the fluid barrier is removed to define a flow path between the seal section and the motor section.

In another example embodiment, disclosed herein is a method of forming an electrical submersible pumping system that includes providing a seal section having a seal housing and a seal shaft, providing a motor section having a motor housing and a motor shaft, sliding a coupling partially over an end of the seal shaft and positioning the coupling in a pre-assembly position, setting a seal between the coupling and the seal housing to retain fluid in the seal section housing, inserting an end of the motor shaft into the coupling opposite the seal shaft while the coupling is in the pre-assembly position, and with the motor shaft, pushing the coupling further into the seal section housing, to position the coupling in the assembled position, and disengage the seal from sealing engagement with the coupling so that the motor housing and the seal housing are in fluid communication with each other.

BRIEF DESCRIPTION OF THE DRAWINGS

Some of the features and benefits of the present disclosure having been stated, others will become apparent as the description proceeds when taken in conjunction with the accompanying drawings, in which.

While the subject device and method will be described in connection with the preferred embodiments but not limited thereto. On the contrary, it is intended to cover all alternatives, modifications, and equivalents, as may be included within the spirit and scope of the present disclosure as defined by the appended claims.

DETAILED DESCRIPTION OF THE INVENTION

The method and system of the present disclosure will now be described more fully hereinafter with reference to the accompanying drawings in which embodiments are shown. The described method and system may be in many different forms and should not be construed as limited to the illustrated embodiments set forth herein; rather, these embodiments are provided so that this disclosure will be through and complete, and will fully convey its scope to those skilled in the art. Like numbers refer to like elements throughout.

Figure 1:
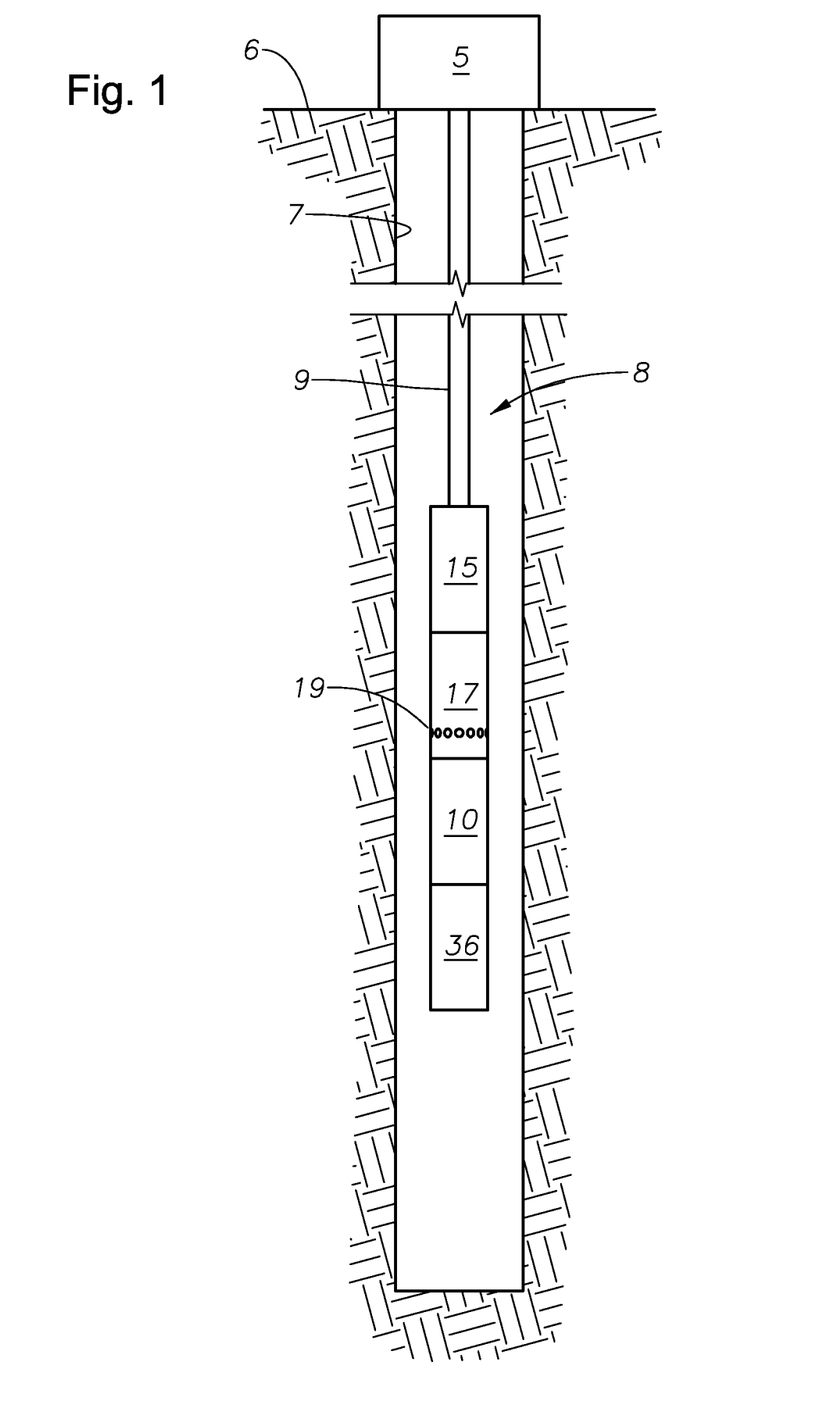
FIG. 1 is a side sectional view of a submersible pumping system disposed in a wellbore.

FIG. 1 is a side partial section view of an example of an ESP system 8. In this example, the ESP system 8 is disposed in a wellbore 7 that intersects a subterranean formation 6. The ESP system 8 includes a motor section 36 having an electrical motor (not shown) within for driving a pump 15. A seal section 10 is also included shown adjacent the motor section 36. An optional gas separator 17 is shown disposed between the seal section 10 and pump 15. Fluid inlets 19 project through the gas separator 17 housing to provide a pathway for fluid in the wellbore 7 to enter the ESP system 8. Fluid discharged from the pump 15 of FIG. 1 is pumped through production tubing 9 shown connected to the pump 15; the pumped fluid may be directed within the production tubing 9 to a production tree 5 located at the surface.

Figure 2:
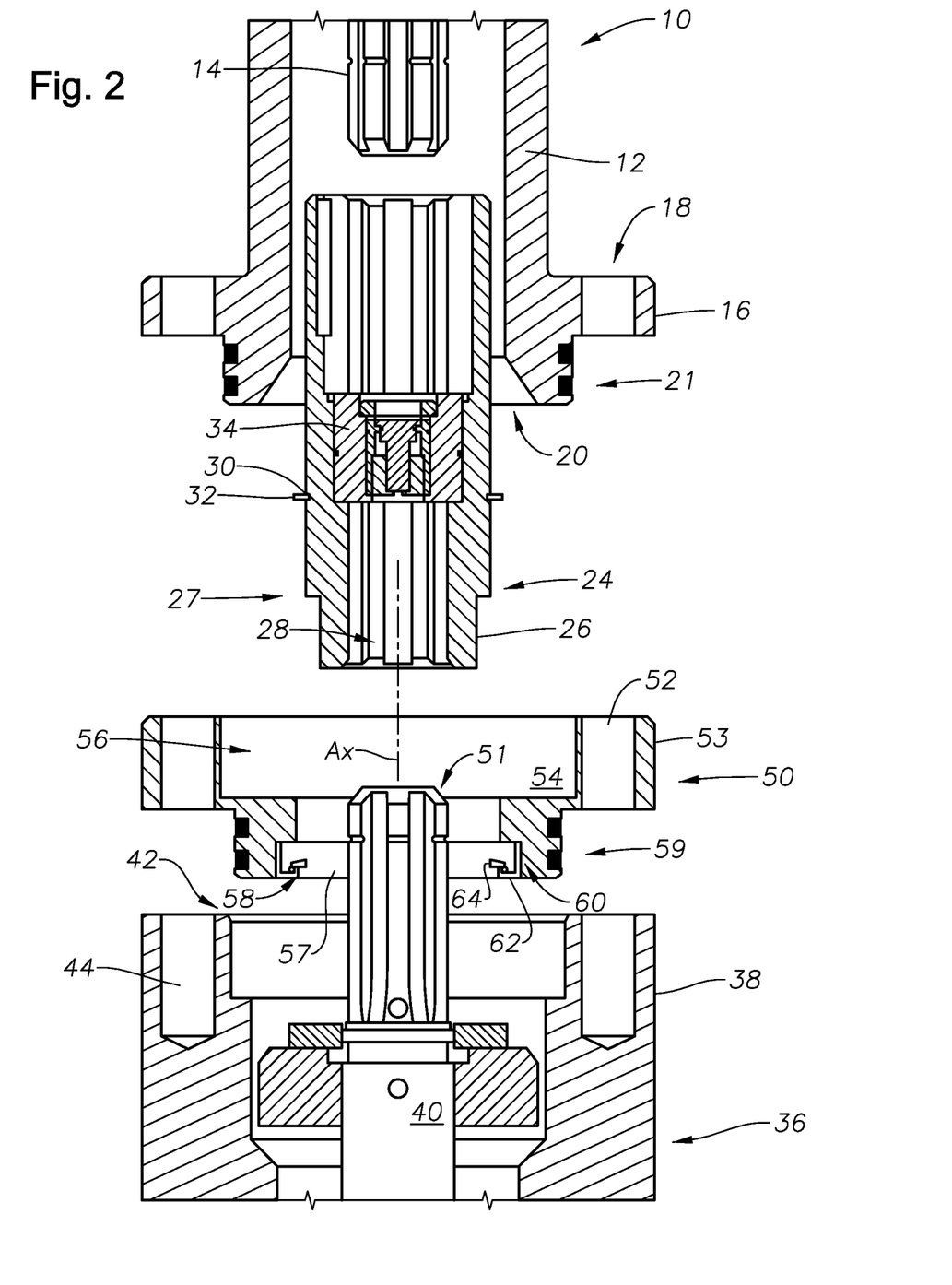
FIG. 2 is an exploded partially sectional view of an embodiment of a coupling assembly for use with an electrical submersible pumping system in accordance with the present disclosure.

Assembling an ESP system 8 includes attaching shafts within adjacent members of the ESP 8. FIG. 2 is an exploded side partial sectional view of respective mating portions of the seal section 10 and the motor section 36 being brought together for coupling engagement by an annular coupling 24. The step of coupling includes inserting the coupling 24 and an adapter plate 50 between the seal section 10 and motor section 36. As shown in FIG. 2, the seal section 10 includes a body 12 with a seal shaft 14 coaxially aligned in the body 12. The seal shaft 14 lower end projects from the seal body 12 and the seal shaft 14 upper end connects to a pump shaft (not shown) used in driving the pump 15 (FIG. 1). A flange 16 is shown projecting radially outward from the outer surface of the body 12 on its lower end. Bolt holes 18 are formed through the flange 16 and substantially parallel with an axis $A_X$ of the coupling 24. Bolts (not shown) can be inserted through the bolt holes 18 for securing the seal section 10 to the motor section 36. The lower portion of the seal body 12 is annular with an opening 20 shown receiving the coupling 24. Seals 21 are shown provided on the outer surface of the body 12 in the region between the flange 16 and the opening 20. The coupling 24 as shown is a substantially cylindrical body 26 having a bore 28 circumscribing its axis $A_X$. Female splines provided on the bore 28 outer periphery are contoured to engage and mate with corresponding male splines on the seal shaft 14. Shown upwardly extending from the motor 36 is a motor shaft 40 having male splines on the outer surface of its upper end configured to engage the female splines in the bore 28. Flow within the shaft coupling 24 is prevented by a flow barrier 34 sealingly disposed within the bore 28. A seal 33 is shown on the outer surface of the flow barrier 34. In the embodiment illustrated, the flow barrier 34 includes a check valve 35, but the flow barrier 34 can be any device that seals within the bore 28 to prevent fluid communication through the shaft coupling 24. Alternatively, a disk transverse to the axis $A_X$ and in the bore 28 can be used for blocking flow through the shaft coupling 24.

The outer surface of the body 26 transitions inward proximate its lower end to form a shoulder 27 on the body 26 shown on the side of the flow barrier 34 opposite the seal shaft 14. A groove 30 is shown circumscribing the outer surface of the body 26 at about is mid section; a retaining ring 32 is provided in the groove 30. As will be described in further detail below, the coupling 24 is insertable onto the seal shaft 14 by applying an axial force to the retaining ring 32.

The adapter plate 50, shown between the coupling 24 and the motor section 36, is a generally disk like member with an axial bore 51 formed therethrough. An upper cavity 54 in the adapter plate 50 circumscribes the bore 51 and faces the coupling 24. The adapter plate 50 includes a radial flange 53 on its outer surface on the side facing the seal 10. Bolt holes 52 are axially formed through the flange 53 and border the upper cavity 54. The upper cavity 54 provides an upper opening 56 on the adapter plate 50. A corresponding lower cavity 57 is formed on the adapter plate 50 lower surface thereby forming a lower opening 58. Seals 59 are shown on the outer surface of portion the adapter plate 50 on the portion circumscribing the lower cavity 57 and bore 51.

An annular seal assembly 60 is shown disposed within the lower opening 58 that includes a ring like base 62 shown press fit within and coaxial with the cavity 57. A flexible seal 64 is shown attached to the base 62 and along its inner radius. In the embodiment of FIG. 2, the base 62 has an "L" shaped cross section, with the elongate portion of the "L" adjacent the wall of the cavity 57 and the shorter and horizontally oriented portion of the "L" projecting radially inward from the wall of the cavity 57. The flexible seal 64 projects radially inward from the base 62 toward the adapter plate 50 axis. In one embodiment, the base 62 is comprised of a metal or metallic material, the flexible seal 64 may be formed from an elastomer or elastomeric material, such as silicone or rubber.

Still referring to FIG. 2, a housing 38 is provided that encloses therein motor section 36 components, including a portion of the motor shaft 40. Bolt holes 44, axially projecting into the body 38, can be used for attachment via fasteners to the seal section 10. Optionally, threaded fittings can be used in lieu of the fasteners. A cylindrically shaped housing opening 42 is shown within the housing 38 upper end through which the motor shaft 40 upwardly extends.

Figure 3:
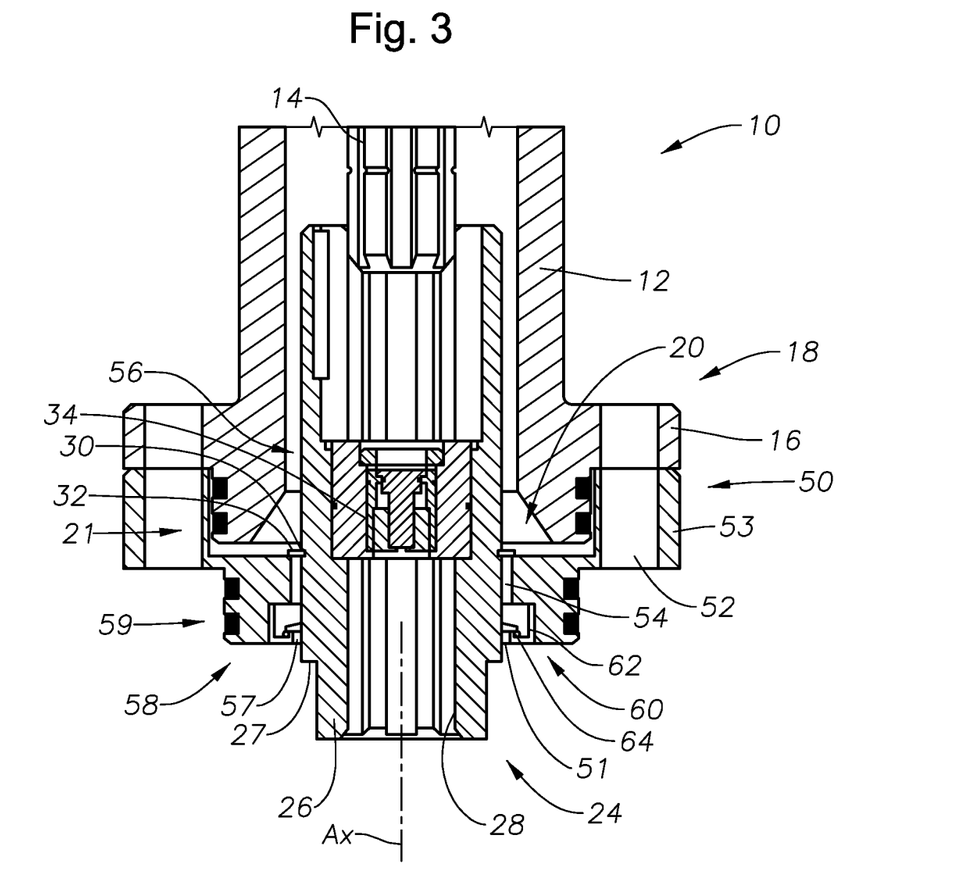
FIG. 3 depicts partial assembly of the coupling assembly of FIG. 2 in a side sectional view.

With reference now to FIG. 3, shown in a side partial sectional view is an example of a step of assembling the seal section 10 and the motor section 36. The coupling 24 is shown inserted within the seal body 12 and with the upper end of the coupling 24 engaging the seal shaft 14. The adapter plate 50 is coaxially set against the seal section 10 lower end, having its flange 53 positioned adjacent the seal section flange 16 and the seal section bolt holes 18 aligned with the adapter plate bold holes 52. When so aligned, the lower end of the coupling 24 projects outside of the seal section opening 20 and within the bore 51 of the adapter plate 50. The entire adapter plate 50 has slid past the shoulder 27 so that it is between the shoulder 27 and the groove 30. In this configuration, the flexible seal 64 at the inner radius of the seal assembly 60 contactingly circumscribes the outer radius of the coupling 24. Also, the seals 21 are in sealing contact with the part of the retaining ring 50 that defines the outer periphery of the upper cavity 54.

As shown, the flexible seal 64 circumscribes the coupling 24 at a location along its axis $A_X$ between the shoulder 27 and the groove 30. The contact between the flexible seal 64 and the outer diameter of the coupling 24 forms a seal interface along the entire outer circumference of the coupling 24. The seal interface prevents fluid from leaking out of the seal section 10 and around the coupling 24. Seals on the flow barrier 34 shown extending between the coupling bore 28 and flow barrier 34 prevent fluid from flowing through the coupling 24. The coupling 24 is secured within the seal section 10 by an interference contact between the retainer ring 32 and the adapter plate 50. An optional second retainer ring (not shown) may be installed on the coupling 24 between the adapter plate 50 and the shoulder 27 to prevent the coupling 24 from sliding through the adapter plate 50. The second retainer ring can be removed when the adapter plate 50 is installed onto the seal section 10.

Figure 4:
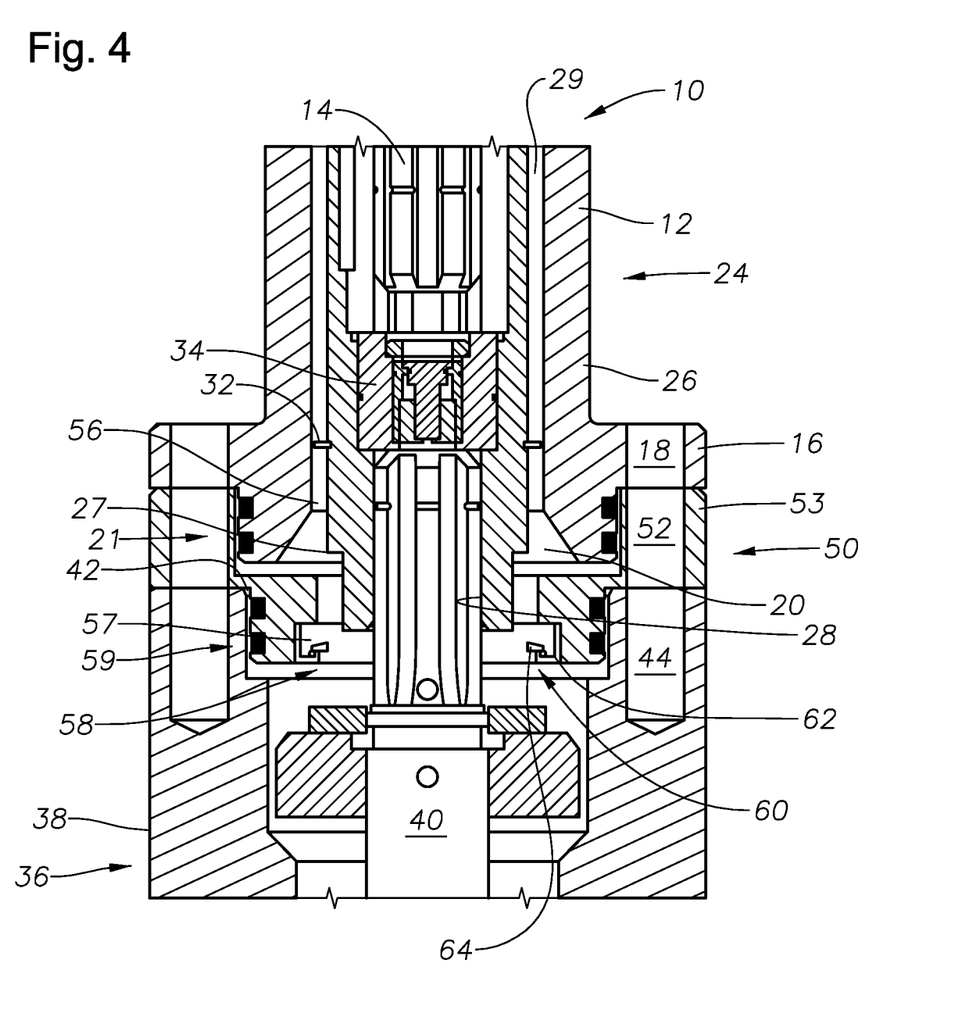
FIG. 4 illustrates an assembled version of the coupling assembly of FIG. 2 in a side sectional view.

As illustrated in a side partial sectional view in FIG. 4, ESP 8 assembly continues by engaging the seal section 10 with the motor section. 36. Here the pump shaft 40 is inserted into the bore 28, which urges the coupling 24 into the seal section 10. Continued inward urging can move the shoulder 27 past the seal assembly 60. The seal assembly 60 is no longer in sealing engagement with the coupling 24, thus removing the fluid barrier at the seal section 10 lower end and allowing fluid communication between the seal 10 and the motor 36. Seal assembly 60 ceases to seal only after the lower end of seal section 10 is inserted into the cavity at the upper end of motor section 36. Without the sealing interface between the seal assembly 60 and the coupling 24, a direct fluid and pressure communication path extends between the motor section 36, through the retainer 50, and along the annulus 29 in the space between the coupling 24 and the seal body 12. The coupling assembly disclosed herein prevents fluid leakage from the seal section 10 prior to ESP 8 assembly, but the barrier it provides is seamlessly removed during assembly to allow pressure communication between the seal section 10 and the motor section 36. In addition to stemming fluid leakage from the seal section 10, the coupling assembly also prevents air ingress to the seal section 10.

Figure 5:
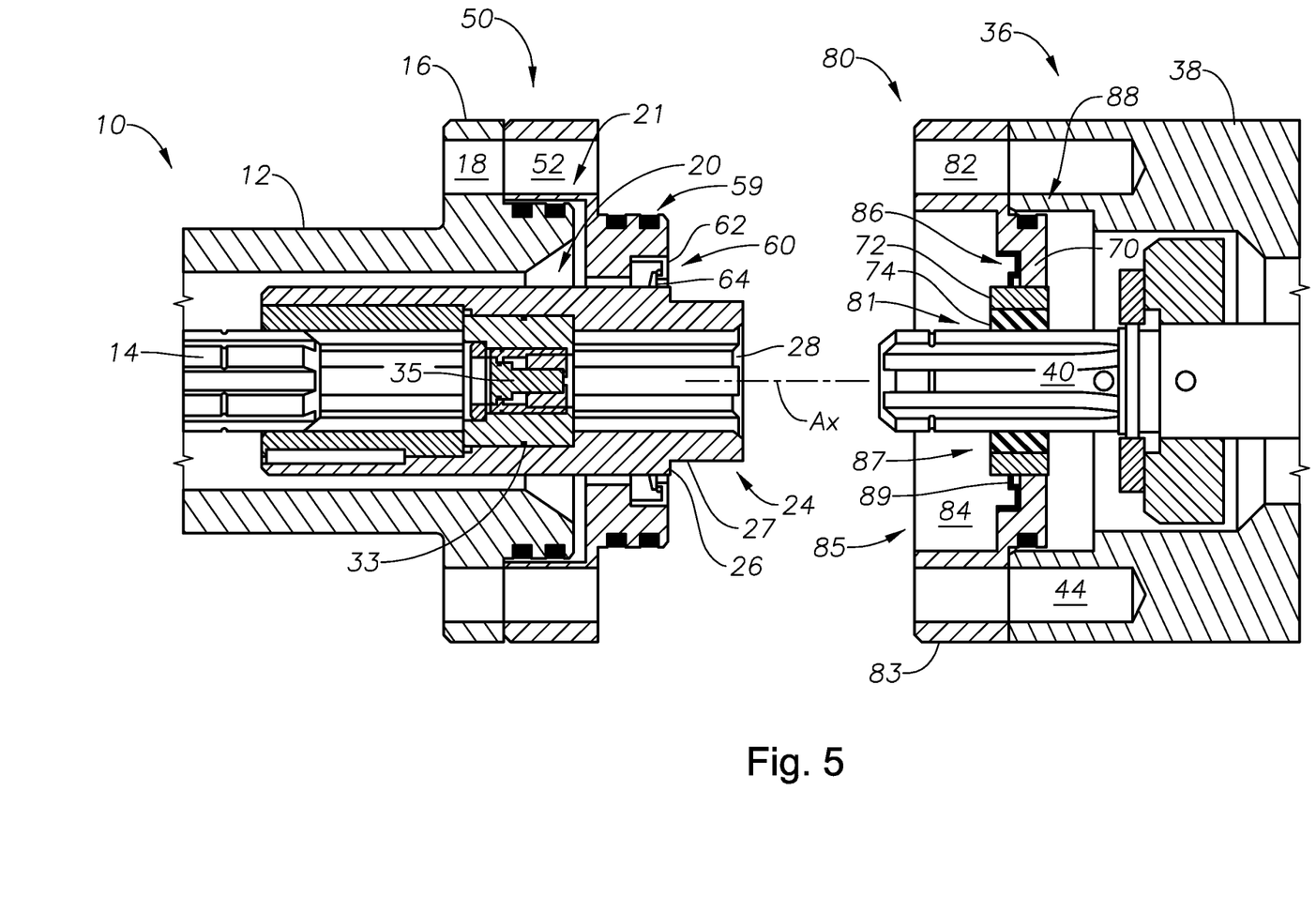
FIG. 5 is an exploded partially sectional view of an alternative coupling assembly.

FIG. 5 depicts an alternative embodiment of a coupling assembly having a motor section retainer plate 80 coupled to the motor section 36. Here the seal section 10 and motor section 36 are in a horizontal orientation during assembly. The adapter plate 50 as described above is shown attached to the seal section 10 and in sealing contact with the coupling 24 thereby sealing fluid within the seal section 10. When the ESP 8 is horizontally assembled, connecting the motor section retainer plate 80 to the motor section 36 can seal fluid in the motor section 36.

More specifically, the motor section retainer plate 80, in the embodiment shown, is an annular member having a bore 81 coaxially formed along its axis. The retainer plate 80 includes an outer cavity 84 formed on its side facing the sealing section 10. The outer cavity 84 provides an opening 85 on the outer side of the adapter plate 80. Also included is a flange 83 circumscribing the upper cavity 84 having bolt holes 82 foamed therethrough that are substantially aligned with the axis $A_X$ of the coupling 24. The bolt holes 82 are shown aligned with bolt holes 44 in the motor section 36. The adapter plate 80 includes an inner cavity 86 shown facing away from the motor section 36 and substantially coaxial with the axis $A_X$ of the coupling 24. A middle cavity 87 is provided in the adapter plate 80 between the outer and inner cavities 84, 86 and circumscribing the bore 81. A seal 88 encircles the portion of the adapter plate 80 that circumscribes the inner and middle cavities 86, 87 projecting radially outward into sealing contact with the motor housing opening 42. A lip seal 89 is illustrated within the cavity 86 for sealing between the adapter plate 80 and outer member 72.

An annular sealing assembly 70 is shown coaxially with the axis $A_X$ and in the annular space between the middle cavity 87 and shaft outer diameter. The sealing assembly 70 of FIG. 5 extends into both the outer and inner cavities 84, 86. In the embodiment shown, the sealing assembly 70 includes an annular outer member 72 having an outer surface contacting the middle cavity 87. The sealing assembly 70 of FIG. 5 further includes an annular inner member 74 that occupies the space between the outer member 72 and the outer surface of the motor shaft 40. A sealing interface is formed between the inner member 74 and the motor shaft 40. In one embodiment, the outer member 72 is formed from a metal or metallic material, and the inner member 74 includes an elastomer or other resilient flexible material. The inner member 74 has a passage formed to match the splines on the shaft 40, thereby sealing against the shaft 40. Thus fluid in the motor section 36 is prevented from leaking out by affixing the motor section retainer plate 80 as illustrated.

Figure 6:
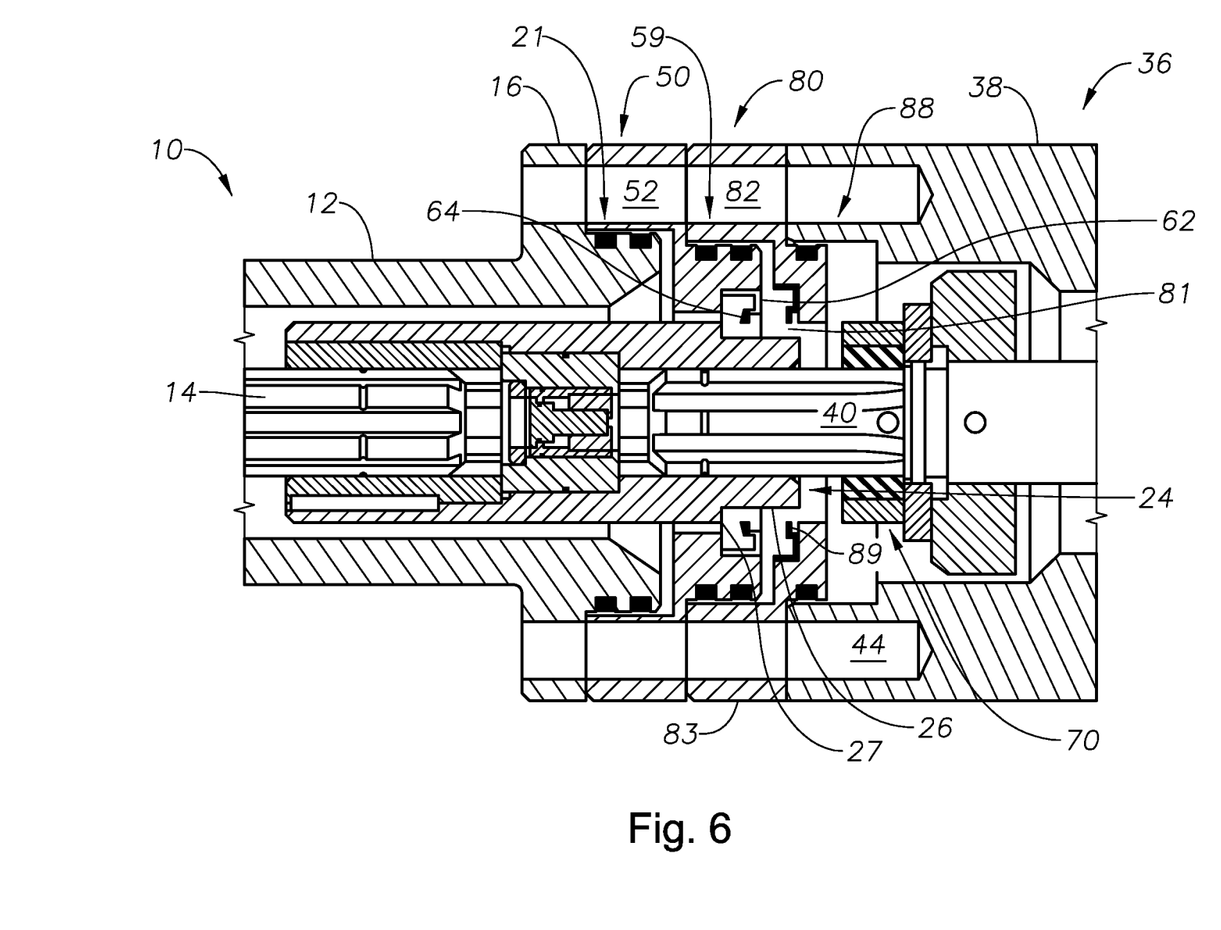
FIG. 6 is an assembled version of the coupling assembly of FIG. 5 in a side sectional view.

FIG. 6 provides an assembled view of the embodiment of FIG. 5. While coupling the seal section 10 to the motor section 36, the lower end of the coupling 24 contacts and urges the sealing assembly 70 from the middle cavity 87 and into the larger diameter inner cavity 86. The inner diameter of the inner cavity 86 exceeds the outer diameter of the sealing assembly 70 to form an annular space between the two, through which fluid in the motor section 36 can flow. Thus pushing the sealing assembly 70 into the inner cavity 86, removes the fluid flow barrier in the motor section adapter plate 80 thereby allowing fluid communication from the motor section 36. As noted above, the flow barrier between the lip seal assembly 60 and the coupling 24 is also removed when coupling the seal section 10 to the motor section 36. Thus open fluid communication between the motor section 36 and the seal section 10 occurs when the two sections are mated.

While the invention has been shown in only one of its forms, it should be apparent to those skilled in the art that it is not so limited, but is susceptible to various changes without departing from the scope of the invention. For example, instead of connecting a seal section to a motor section, the lower section could comprise connecting the seal section to a lower tandem seal section.

The invention claimed is:
1. An electrical submersible pumping system comprising:
a seal section having a housing with an opening at an end, fluid within the housing, and a seal shaft within the opening in the seal housing;
a motor section having a housing having an opening at an end, and a motor shaft extending from the opening in the motor housing;
a tubular coupling assembly having a splined axial bore and selectively moveable between a pre-assembly position with the seal shaft partially inserted into an inner end of the coupling assembly and an assembled position axially spaced from the pre-assembly position with the seal shaft fully inserted into the inner end and the motor shaft fully inserted into an outer end of the coupling assembly to transmit torque from the motor shaft to the seal shaft; and
a seal assembly having a body selectively coupled to the housing of the seal section and having a seal element that projects radially inward from the body and into sealing engagement with an outer diameter portion of the coupling assembly to thereby form a fluid barrier between the outer diameter of the coupling, assembly and housing of the seal section when the coupling assembly is in the pre-assembly position and when the coupling assembly is moved to the assembled position, the fluid barrier is removed to define a flow path between the seal section and the motor sections.
2. The system of claim 1, wherein when the coupling assembly is urged axially along the motor shaft so that the larger outer radius portion is out of sealing contact with the seal element and the seal element circumscribes the smaller outer radius portion, a fluid flow path is formed within an annular space between the coupling assembly and seal housing and an annular space between the seal element and the smaller outer radius portion.

3. The system of claim 1, wherein the end of the axial bore having the seal shaft inserted has a larger outer radius than the opposite end having the motor shaft inserted.

4. The system of claim 1, further comprising splines formed on the outer surface of the motor shaft and seal shaft that are engaged with corresponding splines formed within the axial bore when the motor shaft and seal shaft are inserted within the coupling assembly.

5. The system of claim 1, wherein the seal assembly body is coaxially mounted to the seal section housing on one side, and coaxially mounted to the motor section housing on an opposite side.

6. The system of claim 2, wherein the coupling assembly is axially slideable into the seal housing to slide the shoulder past the seal assembly so that the seal assembly circumscribes the smaller outer radius portion.

7. The system of claim 1, wherein the seal assembly comprises an annular base pressed into an axial passage in the body and wherein the seal element has an outer diameter that attaches to the annular base.

8. The system of claim 1, further comprising an annular sealing assembly affixed to the motor housing comprising, an annular body, a cavity in the annular body through which the motor shaft extends, a sealing disk in the annular space between the motor shaft moveable along the motor shaft so that a fluid communication opens between the motor shaft and the annular body.

9. The system of claim 1, wherein the body comprises a plate like flange.

10. The system of claim 9, further comprising an additional body that comprises a platelike flange and is coaxially disposed with the seal assembly body, and the flange has bolt holes that are selectively registered with bolt holes of the seal assembly body, so that when the coupling assembly is in the assembled position, threaded fasteners can be inserted through the registered bolt holes to attach the seal section, motor section, and a seal section fluid retainer.

11. The system of claim 9, further comprising an upper counterbore that engages seal section seals on the outer diameter of the seal section and a lower portion with external seals that engage a bore of the motor housing.

12. A method of forming an electrical submersible pumping system comprising:
(a) providing a seal section having a seal housing and a seal shaft;
(b) providing, a motor section having a motor housing and a motor shaft;
(c) sliding a coupling partially over an end of the seal shaft and positioning the coupling in a pre-assembly position;
(d) retaining fluid in the seal section housing with an annular disklike seal assembly;
(e) inserting an end of the motor shaft into the coupling opposite the seal shaft while the coupling is in the pre-assembly position; and
(f) with the motor shaft, pushing the coupling further into the seal section housing, to position the coupling in the assembled position, and disengage the seal from sealing engagement with the coupling so that the motor housing and the seal housing are in fluid communication with each other.

13. The method of claim 12, wherein the coupling outer diameter transitions at a shoulder on its outer surface from a larger diameter to a smaller diameter and positioning the seal assembly so that it circumscribes the larger diameter portion of the coupling.

14. The method of claim 12, further comprising setting a seal in a space between the motor shaft and the motor housing.

15. An electrical submersible pumping system comprising:
a seal section comprising;
a housing,
an opening at an end of the housing,
fluid within the housing, and
a seal shaft within the opening in the seal housing;
a motor section comprising:
a housing,
an opening at an end of the housing,
fluid within the housing, and
a motor shaft within the opening in the motor housing;
a disklike seal assembly coupled on an end of the seal section and having an annular seal element;
a tubular coupling assembly having a body, a splined bore formed axially through the body and having the motor shaft and seal shaft, inserted in opposite ends of the bore, a larger diameter portion along a portion of the outer circumference of the body, a smaller diameter portion along a portion of the outer circumference of the body, and a shoulder circumscribing the body defining a transition between the smaller diameter portion and the larger diameter portion,
the coupling assembly in a first position having the body outer surface coaxially disposed to and in sealing contact with the seal element at a location along its larger diameter portion and slideable to a second position having the smaller diameter portion circumscribed by the seal element to provide an annular space between the body and the seal assembly.

16. The pumping system of claim 15, further comprising an annular sealing assembly affixed to the motor housing comprising, an annular body, an axial bore in the body through which the motor shaft extends, a sealing disk in the annular space between the motor shaft moveable along the motor shaft so that a fluid communication opens between the motor shaft and the body.

17. The pumping system of claim 15, wherein the seal assembly comprises an annular base pressed into an axial passage in the seal assembly and wherein the seal element has an outer diameter that attaches to the annular base.

* * * * *

UNITED STATES PATENT AND TRADEMARK OFFICE
CERTIFICATE OF CORRECTION

| | | |
|---|---|---|
| PATENT NO. | : 8,419,390 B2 | Page 1 of 1 |
| APPLICATION NO. | : 12/635191 | |
| DATED | : April 16, 2013 | |
| INVENTOR(S) | : Dan A. Merrill et al. | |

It is certified that error appears in the above-identified patent and that said Letters Patent is hereby corrected as shown below:

In the Specification:

Column 3, line 57, delete "is" before "mid section"

In the Claims:

Claim 15, column 8, line 29, delete "haying" and insert -- having --

Signed and Sealed this
Seventeenth Day of September, 2013

Teresa Stanek Rea
*Deputy Director of the United States Patent and Trademark Office*